(12) United States Patent
 Koh

(10) Patent No.: US 11,599,413 B2
(45) Date of Patent: Mar. 7, 2023

(54) ELECTRONIC SYSTEM INCLUDING ERROR CALCULATION CIRCUIT FOR PERFORMING ERROR CORRECTION OPERATION

(71) Applicant: SK hynix Inc., Icheon-si (KR)

(72) Inventor: In Sung Koh, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 9 days.

(21) Appl. No.: 17/152,378

(22) Filed: Jan. 19, 2021

(65) Prior Publication Data
US 2022/0050742 A1 Feb. 17, 2022

(30) Foreign Application Priority Data
Aug. 14, 2020 (KR) .................. 10-2020-0102582

(51) Int. Cl.
*G06F 11/10* (2006.01)
*G06F 11/00* (2006.01)

(52) U.S. Cl.
CPC ................. *G06F 11/1048* (2013.01)

(58) Field of Classification Search
CPC ...... G06F 11/1048; G06F 11/10; G06F 11/00; H03M 13/00
See application file for complete search history.

(56) References Cited

U.S. PATENT DOCUMENTS

| | | | | |
|---|---|---|---|---|
| 6,442,726 B1* | 8/2002 | Knefel | ................ | G06F 11/1016 714/763 |
| 8,972,835 B1* | 3/2015 | Rahul | ................... | H03M 13/19 714/800 |
| 10,162,703 B2* | 12/2018 | Kim | ....................... | G11C 29/52 |
| 2021/0249097 A1* | 8/2021 | Fujishiro | ............ | G06F 11/1048 |

FOREIGN PATENT DOCUMENTS

KR 1020190072144 A 6/2019

\* cited by examiner

*Primary Examiner* — Justin R Knapp
(74) *Attorney, Agent, or Firm* — William Park & Associates Ltd.

(57) ABSTRACT

An electronic system includes a controller configured to output a clock, a command, and an address, and configured to receive and transmit data. The electronic system also includes a semiconductor device including an error calculation circuit. The semiconductor device is configured to generate, by the error calculation circuit, a parity including information on an error included in transfer data generated from the data, in a write operation initiated by the command, and to generate, by the error calculation circuit, a syndrome including information on an error included in transfer data generated from internal data, in a read operation initiated by the command.

21 Claims, 12 Drawing Sheets

ELECTRONIC SYSTEM INCLUDING ERROR CALCULATION CIRCUIT FOR PERFORMING ERROR CORRECTION OPERATION

CROSS-REFERENCE TO RELATED APPLICATION

The present application claims priority under 35 U.S.C. § 119(a) to Korean Patent Application No. 10-2020-0102582 filed on Aug. 14, 2020, in the Korean Intellectual Property Office, which is incorporated herein by reference in its entirety.

BACKGROUND

1. Technical Field

Embodiments of the disclosure generally relate to an electronic system which shares an error calculation circuit for correcting an error of data in a write operation and a read operation.

2. Related Art

Presently, in order to increase the operating speed of semiconductor devices, DDR2, DDR3, and DDR4 signaling schemes are used, in which data including a plurality of bits such as 4 bits, 8 bits, 16 bits, and 32 bits are inputted/outputted during each clock cycle. When an input/output speed of data is increased, the probability of occurrence of an error during a data transmission process also increases. Therefore, a separate device and method for ensuring the reliability of data transmission are additionally needed.

SUMMARY

Various embodiments are directed to an electronic system which shares, for a write operation and a read operation, a calculation circuit for generating a parity and a syndrome including error information of data in the write operation and the read operation.

In an embodiment, an electronic system may include: a controller configured to output a clock, a command, and an address, and configured to receive and transmit data; and a semiconductor device including an error calculation circuit, the semiconductor device configured to generate, by the error calculation circuit, a parity including information on an error included in transfer data generated from the data, in a write operation initiated by the command, and configured to generate, by the error calculation circuit, a syndrome including information on an error included in transfer data generated from internal data, in a read operation initiated by the command.

In an embodiment, an electronic system may include: a control circuit configured to generate a mode setting signal, a write signal, and a read signal depending on a logic level combination of a command; and an error calculation circuit configured to generate an error correction enable signal and generate a parity including error information depending on a result of calculating bits included in transfer data loaded on an input/output line, in a write operation in which the mode setting signal is enabled and the write signal is inputted, and configured to generate an error correction enable signal and generate a syndrome including error information depending on a result of calculating bits included in transfer data loaded on the input/output line, in a read operation in which the mode setting signal is enabled and the read signal is inputted.

According to the embodiments of the disclosure, an area may be reduced by sharing, for a write operation and a read operation, a calculation circuit for generating a parity and a syndrome including error information of data in the write operation and the read operation.

Also, according to the embodiments of the disclosure, an efficient error correction operation may be performed by sharing, for a write operation and a read operation, the calculation circuit for generating a parity and a syndrome including error information of data loaded on the same input/output line in the write operation and the read operation.

DETAILED DESCRIPTION

The term "preset" means that the numerical value of a parameter is predetermined when the parameter is used in a process or algorithm. Depending on an embodiment, the numerical value of a parameter may be determined when a process or algorithm starts or may be determined during a period in which the process or algorithm is executed.

Terms such as "first" and "second" used to distinguish various components are not limited by components. For example, a first component may be named as a second component, and conversely, the second component may be named as the first component.

When it is described that one component is "coupled" or "connected" to another component, it is to be understood that the component may be coupled or connected thereto directly or by the medium of a component. On the other hand, the descriptions of "directly coupled" and "directly connected" should be understood to mean that one component is coupled and connected to another component directly without intervention of a still another component.

"Logic high level" and "logic low level" are used to describe logic levels of signals. A signal having a "logic high level" is distinguished from a signal having a "logic low level." For example, when a signal having a first voltage corresponds to a "logic high level," a signal having a second voltage may correspond to a "logic low level." Depending on an embodiment, a "logic high level" may be set to a voltage higher than a "logic low level." Meanwhile, depending on an embodiment, logic levels of signals may be set to different logic levels or opposite logic levels. For example, depending on an embodiment, a signal having a logic high level may be set to have a logic low level, and a signal having a logic low level may be set to have a logic high level.

Hereinafter, various embodiments of the disclosure will be described in detail with reference to the accompanying drawings. These embodiments are only for illustrating the disclosure, and the scope of protection of the disclosure is not limited by these embodiments.

Figure 1:
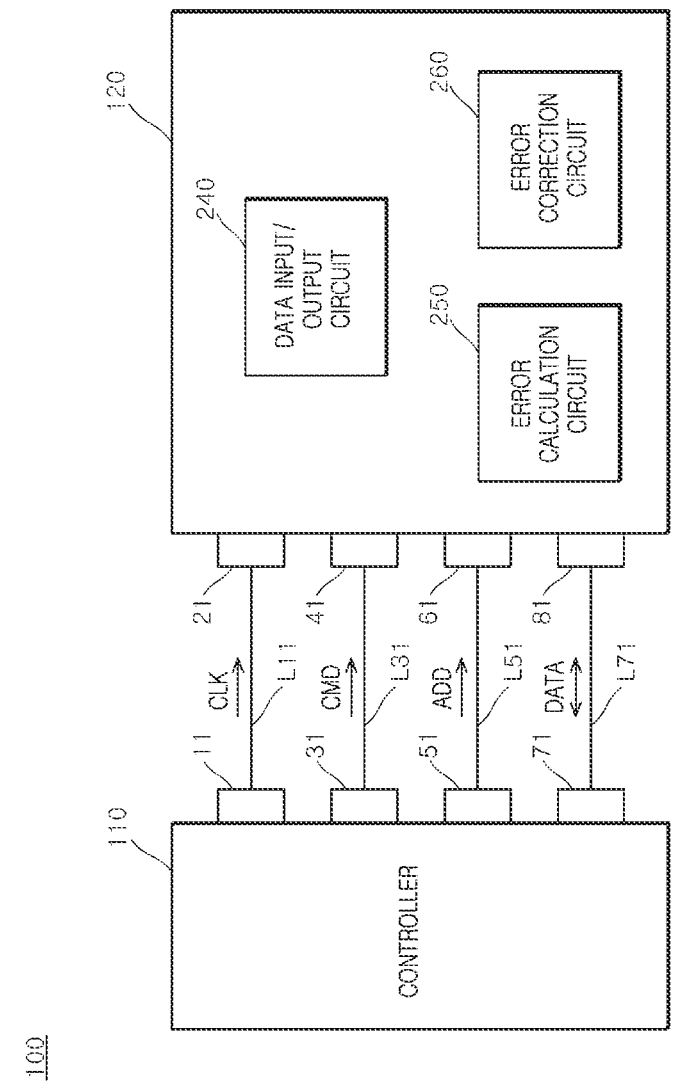
FIG. 1 is a block diagram illustrating a configuration of an electronic system in accordance with an embodiment of the present disclosure.

As illustrated in FIG. 1, an electronic system 100 for performing an error correction operation in accordance with an embodiment of the present disclosure may include a controller 110 and a semiconductor device 120. The semiconductor device 120 may include a data input/output circuit 240, an error calculation circuit 250, and an error correction circuit 260.

The controller 110 may include a first control pin 11, a second control pin 31, a third control pin 51, and a fourth control pin 71. The semiconductor device 120 may include a first semiconductor pin 21, a second semiconductor pin 41, a third semiconductor pin 61, and a fourth semiconductor pin 81. A first transmission line 11 may be coupled between the first control pin 11 and the first semiconductor pin 21. A second transmission line L31 may be coupled between the second control pin 31 and the second semiconductor pin 41. A third transmission line L51 may be coupled between the third control pin 51 and the third semiconductor pin 61. A fourth transmission line L71 may be coupled between the fourth control pin 71 and the fourth semiconductor pin 81. The controller 110 may transmit a clock CLK to the semiconductor device 120 through the first transmission line 11 to control the semiconductor device 120. The controller 110 may transmit a command CMD to the semiconductor device 120 through the second transmission line L31 to control the semiconductor device 120. The controller 110 may transmit an address ADD to the semiconductor device 120 through the third transmission line L51 to control the semiconductor device 120. The controller 110 and the semiconductor device 120 may transmit and receive data DATA through the fourth transmission line L71.

The controller 110 may output, to the semiconductor device 120, the clock CLK, the command CMD, the address ADD, and the data DATA for performing a write operation. The controller 110 may output, to the semiconductor device 120, the clock CLK, the command CMD, and the address ADD for performing a read operation. The controller 110 may receive the data DATA from the semiconductor device 120 in the read operation. The command CMD and the address ADD may be successively outputted in synchronization with an odd pulse or an even pulse included in the clock CLK.

Figure 2:
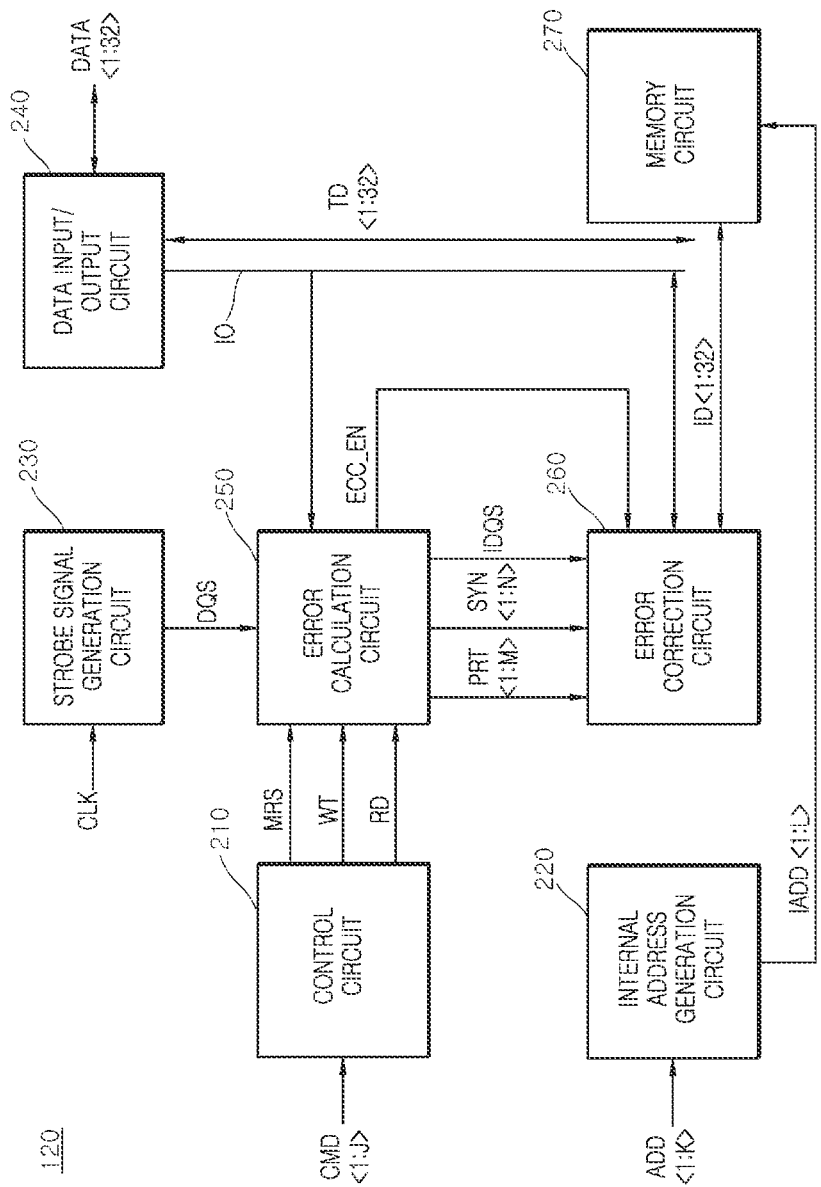
FIG. 2 is a block diagram illustrating a configuration of a semiconductor device included in the electronic system illustrated in FIG. 1.

In the write operation, the data input/output circuit 240 may receive the data DATA from the controller 110 and generate transfer data TD<1:32> (see FIG. 2). In the read operation, the data input/output circuit 240 may generate the data DATA from the transfer data TD<1:32> (see FIG. 2) and output the data DATA to the controller 110.

In the write operation, the error calculation circuit 250 may compare the bits of the transfer data TD<1:32> (see FIG. 2) and generate an error correction enable signal ECC_EN (see FIG. 2) and parities PRT<1:M> (see FIG. 2). In the read operation, the error calculation circuit 250 may compare the bits of the transfer data TD<1:32> (see FIG. 2) and generate the error correction enable signal ECC_EN (see FIG. 2) and syndromes SYN<1:N> (see FIG. 2).

In the write operation, the error correction circuit 260 may correct an error, included in the transfer data TD<1:32> (see FIG. 2), by the parities PRT<1:M> (see FIG. 2) during a period in which the error correction enable signal ECC_EN (see FIG. 2) is enabled, and thereby, may generate internal data ID<1:32> (see FIG. 2). In the read operation, the error correction circuit 260 may correct an error, included in the internal data ID<1:32> (see FIG. 2), by the syndromes SYN<1:N> (see FIG. 2) during a period in which the error correction enable signal ECC_EN (see FIG. 2) is enabled, and thereby, may generate the transfer data TD<1:32> (see FIG. 2).

FIG. 2 is a block diagram illustrating a configuration of the semiconductor device 120 in accordance with the embodiment of the disclosure. As illustrated in FIG. 2, the semiconductor device 120 may include a control circuit 210, an internal address generation circuit 220, a strobe signal generation circuit 230, the data input/output circuit 240, the error calculation circuit 250, the error correction circuit 260, and a memory circuit 270.

The control circuit 210 may generate a mode setting signal MRS, a write signal WT, and a read signal RD depending on a logic level combination of first to J^th commands CMD<1:J>. The control circuit 210 may generate the mode setting signal MRS and the write signal WT which are enabled in the case where the first to J^th commands CMD<1:J> are a logic level combination for performing a write operation. The control circuit 210 may generate the mode setting signal MRS and the read signal RD which are enabled in the case where the first to J^th commands CMD<1:J> are a logic level combination for performing a read operation. The bit number "J" of the first to J^th commands CMD<1:J> may be set to various natural numbers depending on an embodiment.

The internal address generation circuit 220 may generate first to L^th internal addresses IADD<1:L> from first to K^th addresses ADD<1:K>. In the write operation, the internal address generation circuit 220 may generate the first to L^th internal addresses IADD<1:L> by decoding the first to K^th addresses ADD<1:K>. In the read operation, the internal address generation circuit 220 may generate the first to L^th internal addresses IADD<1:L> by decoding the first to K^th addresses ADD<1:K>. The bit number "K" of the first to K^th addresses ADD<1:K> and the bit number "L" of the first to L^th internal addresses IADD<1:L> may be set to various natural numbers depending on an embodiment.

The strobe signal generation circuit 230 may generate a strobe signal DQS from the clock CLK. The strobe signal generation circuit 230 may generate, from the clock CLK, the strobe signal DQS which toggles during a write operation period. The strobe signal generation circuit 230 may generate, from the clock CLK, the strobe signal DQS which toggles during a read operation period.

In the write operation, the data input/output circuit 240 may receive first to 32nd data DATA<1:32> and generate first to 32nd transfer data TD<1:32>. In the write operation, the data input/output circuit 240 may receive the first to 32nd data DATA<1:32> from the controller 110. In the write operation, the data input/output circuit 240 may generate the first to 32nd transfer data TD<1:32> from the first to 32nd data DATA<1:32>. In the write operation, the data input/output circuit 240 may output the first to 32nd transfer data TD<1:32> to an input/output line IO. In the read operation, the data input/output circuit 240 may receive the first to 32nd transfer data TD<1:32> and generate the first to 32nd data DATA<1:32>. In the read operation, the data input/output circuit 240 may receive the first to 32nd transfer data TD<1:32> loaded on the input/output line 10. In the read operation, the data input/output circuit 240 may generate the first to 32nd data DATA<1:32> from the first to 32nd transfer data TD<1:32>. In the read operation, the data input/output circuit 240 may output the first to 32nd data DATA<1:32> to the controller 110. While the input/output line IO is illustrated as one line, the input/output line IO may be implemented to include various numbers of input/output lines depending on an embodiment.

The error calculation circuit 250 may generate the error correction enable signal ECC_EN which is enabled in the case where the mode setting signal MRS is enabled and any one of the write signal WT and the read signal RD is inputted. In the write operation, the error calculation circuit 250 may generate first to M^th parities PRT<1:M> including error information depending on a result of calculating the bits included in the first to 32nd transfer data TD<1:32> loaded on the input/output line IO during a period in which the error correction enable signal ECC_EN is enabled. In the read operation, the error calculation circuit 250 may generate first to N^th syndromes SYN<1:N> including error information depending on a result of calculating the bits included in the first to 32nd transfer data TD<1:32> loaded on the input/output line IO during a period in which the error correction enable signal ECC_EN is enabled. The error calculation circuit 250 may generate an internal strobe signal IDQS from the strobe signal DQS in the case where the mode setting signal MRS is enabled and any one of the write signal WT and the read signal RD is inputted. The bit number "M" of the first to M^th parities PRT<1:M> and the bit number "N" of the first to N^th syndromes SYN<1:N> may be set to various natural numbers depending on an embodiment.

In the write operation, the error correction circuit 260 may generate first to 32nd internal data ID<1:32> by correcting an error included in the first to 32nd transfer data TD<1:32>, by the first to M^th parities PRT<1:M>, during a period in which the error correction enable signal ECC_EN is enabled. In the write operation, the error correction circuit 260 may output the error-corrected first to 32nd internal data ID<1:32> to the memory circuit 270 in synchronization with the internal strobe signal IDQS. In the read operation, the error correction circuit 260 may generate the first to 32nd transfer data TD<1:32> from the first to 32nd internal data ID<1:32>, and may output the first to 32nd transfer data TD<1:32> to the input/output line IO. In the read operation, the error correction circuit 260 may generate the first to 32nd transfer data TD<1:32> by correcting an error included in the first to 32nd internal data ID<1:32>, by the first to N^th syndromes SYN<1:N>, during a period in which the error correction enable signal ECC_EN is enabled. In the read operation, the error correction circuit 260 may output the error-corrected first to 32nd transfer data TD<1:32> to the input/output line IO in synchronization with the internal strobe signal IDQS. The error correction circuit 260 is implemented to generate, in the write operation, the first to 32nd internal data ID<1:32> by correcting an error included in the first to 32nd transfer data TD<1:32>. However, depending on an embodiment, the error correction circuit 260 may be implemented to store the first to M^th parities PRT<1:M> in the memory circuit 270.

In the write operation, the memory circuit 270 may store the first to 32nd internal data ID<1:32> in a memory region (not illustrated) selected by the first to L^th internal addresses IADD<1:L>. In the read operation, the memory circuit 270 may output the first to 32nd internal data ID<1:32> stored in a memory region (not illustrated) selected by the first to L^th internal addresses IADD<1:L>. The memory circuit 270 is implemented to store the first to 32nd internal data ID<1:32> in the write operation, but may be implemented to have a separate memory region (not illustrated) which stores the first to M^th parities PRT<1:M>.

Figure 3:
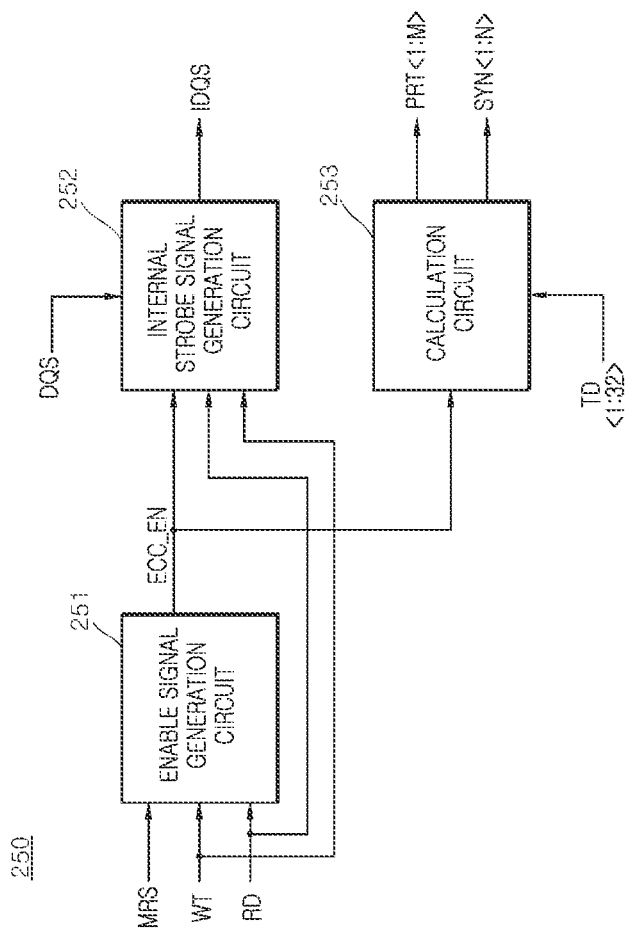
FIG. 3 is a block diagram illustrating a configuration of an error calculation circuit included in the semiconductor device illustrated in FIG. 2.

As illustrated in FIG. 3, the error calculation circuit 250 in accordance with the embodiment of the disclosure may include an enable signal generation circuit 251, an internal strobe signal generation circuit 252, and a calculation circuit 253.

The enable signal generation circuit 251 may generate the error correction enable signal ECC_EN depending on logic levels of the mode setting signal MRS, the write signal WT, and the read signal RD. The enable signal generation circuit 251 may generate the error correction enable signal ECC_EN which is enabled in the case where any one of the write signal WT and the read signal RD is inputted during a period in which the mode setting signal MRS is enabled.

The internal strobe signal generation circuit 252 may generate the internal strobe signal IDQS from the strobe signal DQS depending on logic levels of the error correction enable signal ECC_EN, the write signal WT, and the read signal RD. The internal strobe signal generation circuit 252 may generate the internal strobe signal IDQS from the strobe signal DQS in the case where any one of the write signal WT and the read signal RD is inputted during a period in which the error correction enable signal ECC_EN is enabled.

The calculation circuit 253 may generate, in the write operation, the first to M^th parities PRT<1:M> including error information by comparing the bits, included in the first to 32nd transfer data TD<1:32>, during a period in which the error correction enable signal ECC_EN is enabled. The calculation circuit 253 may generate, in the read operation, the first to N^th syndromes SYN<1:N> including error information by comparing the bits, included in the first to 32nd transfer data TD<1:32>, during a period in which the error correction enable signal ECC_EN is enabled.

Figure 4:
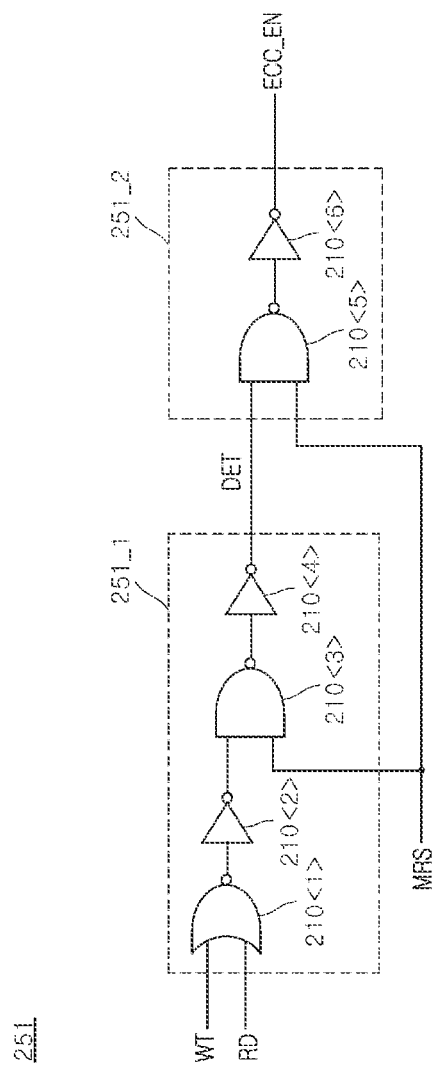
FIG. 4 is a circuit diagram illustrating a configuration of an enable signal generation circuit included in the error calculation circuit illustrated in FIG. 3.

As illustrated in FIG. 4, the enable signal generation circuit 251 in accordance with the embodiment of the disclosure may include a detection signal generation circuit 251_1 and a buffer circuit 251_2.

The detection signal generation circuit 251_1 may be implemented as a NOR gate 210<1>, an inverter 210<2>, a NAND gate 210<3>, and an inverter 210<4>, which are coupled in series. The detection signal generation circuit 251_1 may generate a detection signal DET which is enabled in the case where any one of the write signal WT and the read signal RD is inputted during a period in which the mode setting signal MRS is enabled. The detection signal generation circuit 2511 may generate the detection signal DET which is enabled to a logic high level in the case where the write signal WT is inputted at a logic high level during a period in which the mode setting signal MRS is inputted at a logic high level.

The detection signal generation circuit 2511 may generate the detection signal DET which is enabled to a logic high level in the case where the read signal RD is inputted at a logic high level during a period in which the mode setting signal MRS is inputted at a logic high level. The detection signal generation circuit 251_1 may generate the detection signal DET which is disabled to a logic low level during a period in which the mode setting signal MRS is inputted at a logic low level.

The buffer circuit 2512 may be implemented as a NAND gate 210<5>, and an inverter 210<6>, which are coupled in series. The buffer circuit 251_2 may generate the error correction enable signal ECC_EN by buffering the detection signal DET during a period in which the mode setting signal MRS is enabled. The buffer circuit 251_2 may generate the error correction enable signal ECC_EN by buffering the detection signal DET during a period in which the mode setting signal MRS is inputted at a logic high level. The buffer circuit 251_2 may generate the error correction enable signal ECC_EN which is enabled to a logic high level in the case where the detection signal DET is inputted at a logic high level during a period in which the mode setting signal MRS is inputted at a logic high level. The buffer circuit 251_2 may generate the error correction enable signal ECC_EN which is disabled to a logic low level during a period in which the mode setting signal MRS is inputted at a logic low level.

Figure 5:
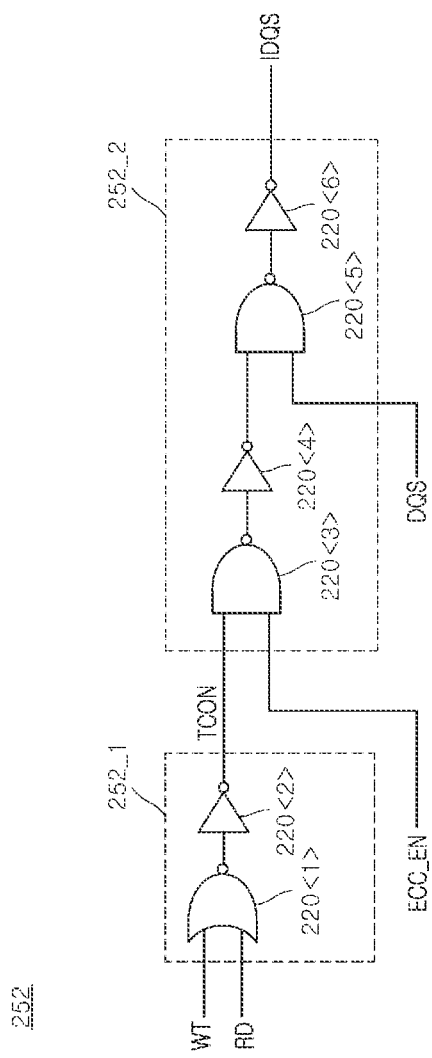
FIG. 5 is a circuit diagram illustrating a configuration of an internal strobe signal generation circuit included in the error calculation circuit illustrated in FIG. 3.

As illustrated in FIG. 5, the internal strobe signal generation circuit 252 in accordance with the embodiment of the disclosure may include a transfer control signal generation circuit 252_1 and a signal transfer circuit 252_2.

The transfer control signal generation circuit 252_1 may be implemented as a NOR gate 220<1>, and an inverter 220<2>, which are coupled in series. The transfer control signal generation circuit 252_1 may generate a transfer control signal TCON which is enabled in the case where any one of the write signal WT and the read signal RD is inputted. The transfer control signal generation circuit 252_1 may generate the transfer control signal TCON which is enabled to a logic high level in the case where the write signal WT is inputted at a logic high level. The transfer control signal generation circuit 252_1 may generate the transfer control signal TCON which is enabled to a logic high level in the case where the read signal RD is inputted at a logic high level.

The signal transfer circuit 2522 may be implemented as a NAND gate 220<3>, an inverter 220<4>, a NAND gate 220<5>, and an inverter 220<6>, which are coupled in series. The signal transfer circuit 252_2 may generate the internal strobe signal IDQS by buffering the strobe signal DQS during a period in which the error correction enable signal ECC_EN and the transfer control signal TCON are enabled. The signal transfer circuit 252_2 may generate the internal strobe signal IDQS by buffering the strobe signal DQS during a period in which the error correction enable signal ECC_EN and the transfer control signal TCON are inputted at logic high levels. The signal transfer circuit 252_2 may generate the internal strobe signal IDQS of a logic low level in the case where any one of the error correction enable signal ECC_EN and the transfer control signal TCON is inputted at a logic low level.

Figure 6:
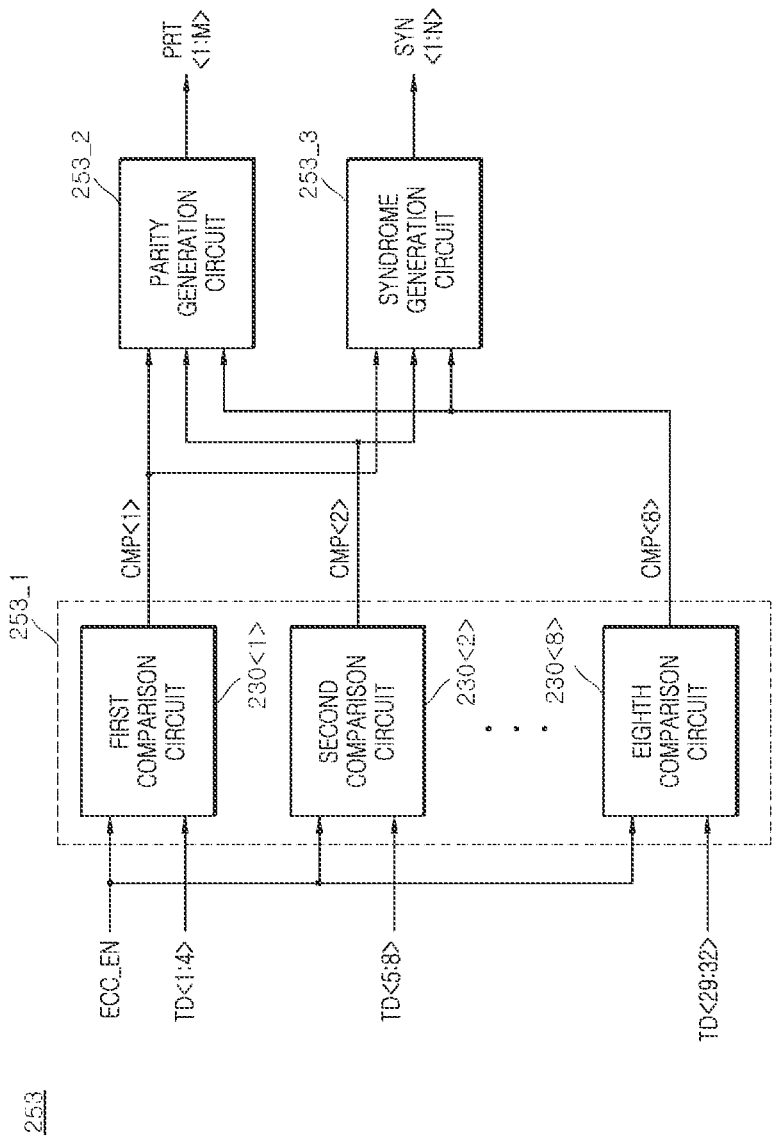
FIG. 6 is a block diagram illustrating a configuration of a calculation circuit included in the error calculation circuit illustrated in FIG. 3.

As illustrated in FIG. 6, the calculation circuit 253 in accordance with the embodiment of the disclosure may include a comparison signal generation circuit 253_1, a parity generation circuit 253_2, and a syndrome generation circuit 253_3.

The comparison signal generation circuit 253_1 may include first to eighth comparison circuits 230<1> to 230<8>.

The first comparison circuit 230<1> may generate a first comparison signal CMP<1> by comparing first transfer data DT<1>, second transfer data DT<2>, third transfer data DT<3>, and fourth transfer data DT<4> during a period in which the error correction enable signal ECC_EN is enabled to a logic high level. The first comparison circuit 230<1> may be implemented by a plurality of XOR gates, and thereby, may generate the first comparison signal CMP<1> by comparing the first transfer data DT<1>, the second transfer data DT<2>, the third transfer data DT<3>, and the fourth transfer data DT<4>. The first comparison circuit 230<1> is implemented to compare four bits, that is, the first transfer data DT<1>, the second transfer data DT<2>, the third transfer data DT<3>, and the fourth transfer data DT<4>, but may be implemented to generate the first comparison signal CMP<1> by comparing various bits included in the first to 32nd transfer data TD<1:32>.

The second comparison circuit 230<2> may generate a second comparison signal CMP<2> by comparing fifth transfer data DT<5>, sixth transfer data DT<6>, seventh transfer data DT<7>, and eighth transfer data DT<8> during a period in which the error correction enable signal ECC_EN is enabled to a logic high level. The second comparison circuit 230<2> may be implemented by a plurality of XOR gates, and thereby, may generate the second comparison signal CMP<2> by comparing the fifth transfer data DT<5>, the sixth transfer data DT<6>, the seventh transfer data DT<7>, and the eighth transfer data DT<8>. The second comparison circuit 230<2> is implemented to compare four bits, that is, the fifth transfer data DT<5>, the sixth transfer data DT<6>, the seventh transfer data DT<7>, and the eighth transfer data DT<8>, but may be implemented to generate the second comparison signal CMP<2> by comparing various bits included in the first to 32nd transfer data TD<1:32>.

The third to eighth comparison circuits 230<3> to 230<8> are implemented by the same circuit and perform the same operation as the first and second comparison circuits 230<1> and 230<2> except that only input and output signals thereof are different, and thus, detailed description thereof will be omitted.

The parity generation circuit 253_2 may generate the first to M^th parities PRT<1:M> depending on a result of calculating the first to eighth comparison signals CMP<1:8>. The parity generation circuit 253_2 may generate the first to M^th parities PRT<1:M> depending on a result of calculating the first to eighth comparison signals CMP<1:8> by using an error correction code (ECC). The parity generation circuit 253_2 may be implemented by a circuit which generates parity bits in a general error correction circuit (ECC circuit).

The syndrome generation circuit 253_3 may generate the first to N^th syndromes SYN<1:N> depending on a result of calculating the first to eighth comparison signals CMP<1:8>. The syndrome generation circuit 253_3 may generate the first to N^th syndromes SYN<1:N> depending on a result of calculating the first to eighth comparison signals CMP<1:8> by using an error correction code (ECC). The syndrome generation circuit 253_3 may be implemented by a circuit which generates parity bits in a general error correction circuit (ECC circuit).

Figure 7:
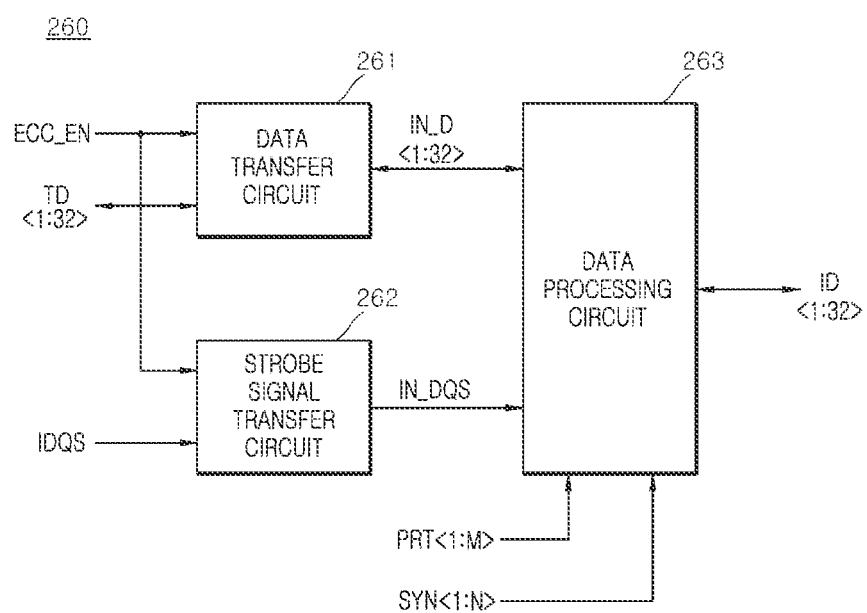
FIG. 7 is a block diagram illustrating a configuration of an error correction circuit included in the semiconductor device illustrated in FIG. 2.

As illustrated in FIG. 7, the error correction circuit 260 in accordance with the embodiment of the disclosure may include a data transfer circuit 261, a strobe signal transfer circuit 262, and a data processing circuit 263.

The data transfer circuit 261 may output, in the write operation, the first to 32nd transfer data TD<1:32> as first to 32nd input data IN_D<1:32> during a period in which the error correction enable signal ECC_EN is enabled. In the write operation, the data transfer circuit 261 may output the first to 32nd transfer data TD<1:32>, loaded on the input/output line IO (see FIG. 2), as the first to 32nd input data IN_D<1:32>. The data transfer circuit 261 may output, in the read operation, the first to 32nd input data IN_D<1:32> as the first to 32nd transfer data TD<1:32> during a period in which the error correction enable signal ECC_EN is enabled. In the read operation, the data transfer circuit 261 may output the first to 32nd transfer data TD<1:32> to the input/output line IO (see FIG. 2) during a period in which the error correction enable signal ECC_EN is enabled.

The strobe signal transfer circuit 262 may transfer, in the write operation, the internal strobe signal IDQS as an input strobe signal IN_DQS during a period in which the error correction enable signal ECC_EN is enabled. The strobe signal transfer circuit 262 may transfer, in the read operation, the internal strobe signal IDQS as the input strobe signal IN_DQS during a period in which the error correction enable signal ECC_EN is enabled.

The data processing circuit 263 may generate, in the write operation, the first to 32nd internal data ID<1:32> by correcting an error, included in the first to 32nd input data IN_D<1:32>, by the first to M^th parities PRT<1:M> in synchronization with the input strobe signal IN_DQS. In the write operation, the data processing circuit 263 may output the error-corrected first to 32nd internal data ID<1:32> to the memory circuit 270 (see FIG. 2). The data processing circuit 263 may generate, in the read operation, the first to 32nd input data IN_D<1:32> by correcting an error, included in the first to 32nd internal data ID<1:32>, by the first to N^th syndromes SYN<1:N> in synchronization with the input strobe signal IN_DQS. In the read operation, the data processing circuit 263 may output the first to 32nd input data IN_D<1:32> by correcting an error of the first to 32nd internal data ID<1:32> outputted from the memory circuit 270 (see FIG. 2).

Figure 8:
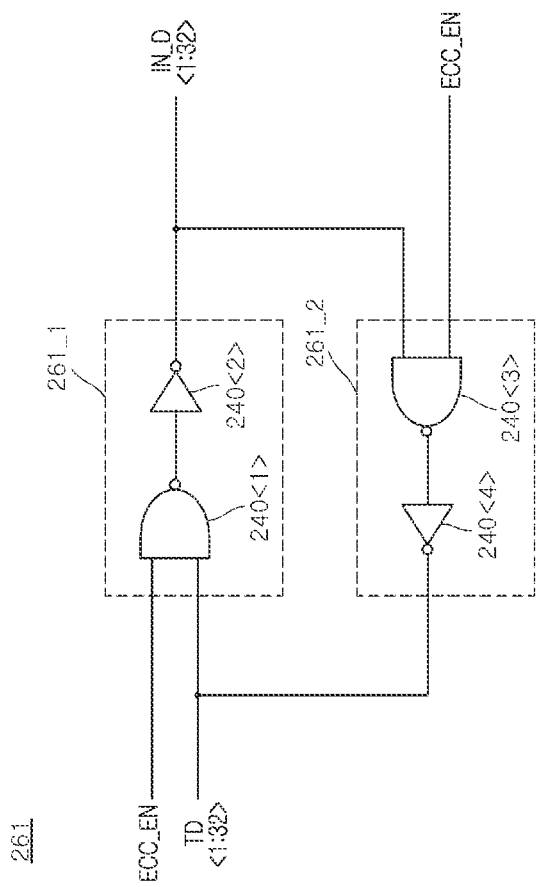
FIG. 8 is a circuit diagram illustrating a configuration of a data transfer circuit included in the error correction circuit illustrated in FIG. 7.

As illustrated in FIG. 8, the data transfer circuit 261 in accordance with the embodiment of the disclosure may include a write data transfer circuit 261_1 and a read data transfer circuit 261_2.

The write data transfer circuit 261_1 may be implemented as a NAND gate 240<1> and an inverter 240<2>, which are coupled in series. In the write operation, the write data transfer circuit 261_1 may output the first to 32nd input data IN_D<1:32> by buffering the first to 32nd transfer data TD<1:32> during a period in which the error correction enable signal ECC_EN is enabled to a logic high level. The write data transfer circuit 261_1 may generate the first to 32nd input data IN_D<1:32> of the logic low levels during a period in which the error correction enable signal ECC_EN is disabled to a logic low level.

The read data transfer circuit 261_2 may be implemented as a NAND gate 240<3> and an inverter 240<4>, which are coupled in series. In the read operation, the read data transfer circuit 261_2 may output the first to 32nd transfer data TD<1:32> by buffering the first to 32nd input data IN_D<1:32> during a period in which the error correction enable signal ECC_EN is enabled to a logic high level. The read data transfer circuit 261_2 may generate the first to 32nd transfer data TD<1:32> of logic low levels during a period in which the error correction enable signal ECC_EN is disabled to a logic low level.

Figure 9:
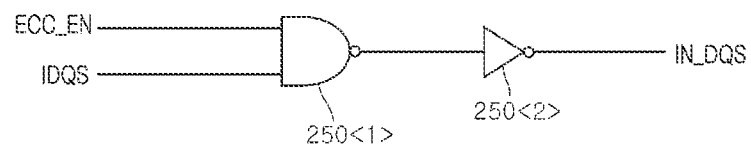
FIG. 9 is a circuit diagram illustrating a configuration of a strobe signal transfer circuit included in the error correction circuit illustrated in FIG. 7.

As illustrated in FIG. 9, the strobe signal transfer circuit 262 in accordance with the embodiment of the disclosure may be implemented as a NAND gate 250<1> and an inverter 250<2>, which are coupled in series.

In the write operation, the strobe signal transfer circuit 262 may generate the input strobe signal IN_DQS by buffering the internal strobe signal IDQS during a period in which the error correction enable signal ECC_EN is enabled to a logic high level. In the read operation, the strobe signal transfer circuit 262 may generate the input strobe signal IN_DQS by buffering the internal strobe signal IDQS during a period in which the error correction enable signal ECC_EN is enabled to a logic high level.

Figure 10:
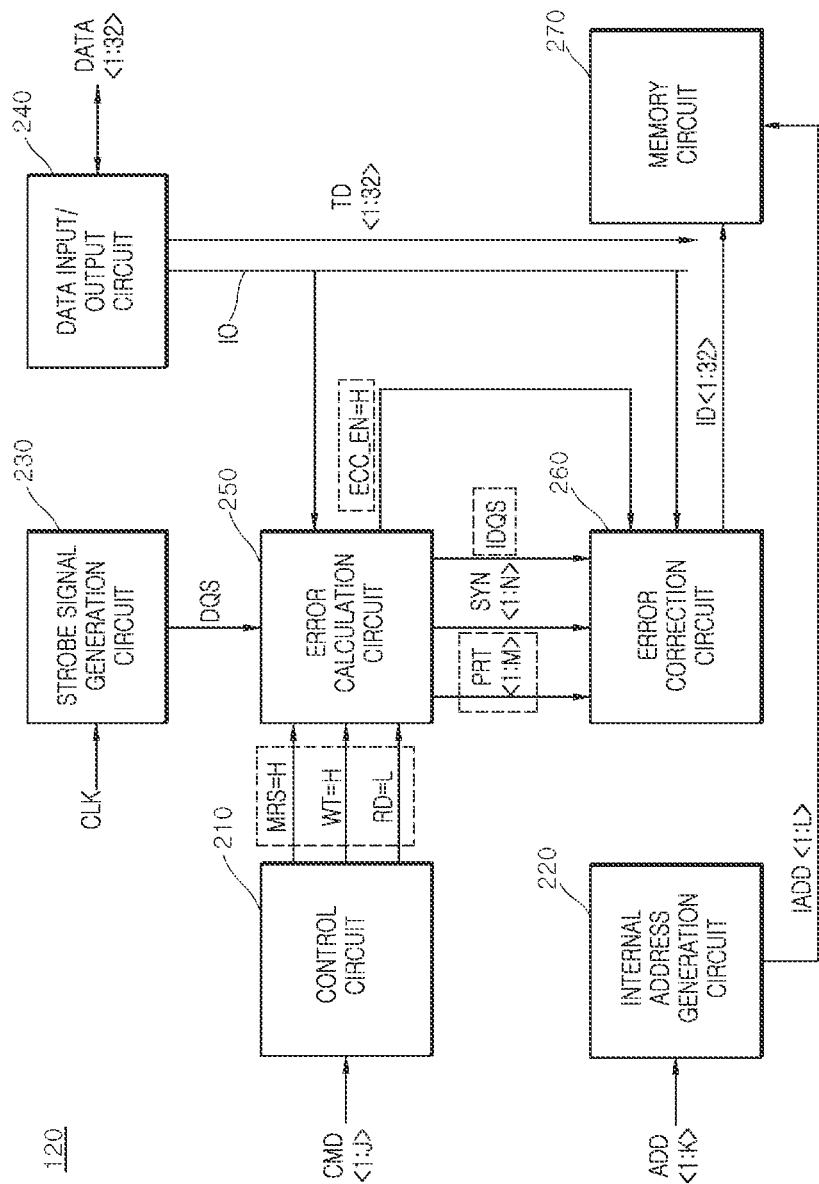
FIGS. 10 and 11 are block diagrams illustrating operation of a semiconductor device in accordance with the embodiment of the present disclosure.

An error correction operation of correcting an error included in the first to 32nd data DATA<1:32> and storing error-corrected data during a write operation of the electronic system 100 in accordance with the embodiment of the disclosure will be described below as an example with reference to FIG. 10.

Before making description, the controller 110 outputs the clock CLK, the first to J^th commands CMD<1:J>, the first to K^th addresses ADD<1:K>, and the first to 32nd data DATA<1:32> for performing a write operation.

The control circuit 210 generates the mode setting signal MRS and the write signal WT which are enabled to logic high levels, by receiving the first to J^th commands CMD<1:J> for performing a write operation.

In the write operation, the internal address generation circuit 220 generates the first to L^th internal addresses IADD<1:L> by decoding the first to K^th addresses ADD<1:K>.

The strobe signal generation circuit 230 generates, from the clock CLK, the strobe signal DQS which toggles during a write operation period.

The data input/output circuit 240 generates the first to 32nd transfer data TD<1:32> by receiving the first to 32nd data DATA<1:32> from the controller 110. The data input/output circuit 240 outputs the first to 32nd transfer data TD<1:32> to the input/output line IO.

The error calculation circuit 250 generates the error correction enable signal ECC_EN which is enabled to a logic high level, by receiving the mode setting signal MRS of a logic high level and the write signal WT of a logic high level. The error calculation circuit 250 generates the first to M^th parities PRT<1:M> including error information depending on a result of calculating the bits included in the first to 32nd transfer data TD<1:32> loaded on the input/output line IO during a period in which the error correction enable signal ECC_EN is enabled. The error calculation circuit 250 generates the internal strobe signal IDQS from the strobe signal DQS, by receiving the mode setting signal MRS of a logic high level and the write signal WT of a logic high level.

The error correction circuit 260 generates the first to 32nd internal data ID<1:32> by correcting an error included in the first to 32nd transfer data TD<1:32>, by the first to M^th parities PRT<1:M>, during a period in which the error correction enable signal ECC_EN is enabled. The error correction circuit 260 outputs the error-corrected first to 32nd internal data ID<1:32> to the memory circuit 270 in synchronization with the internal strobe signal IDQS.

The memory circuit 270 stores the first to 32nd internal data ID<1:32> in a memory region (not illustrated) selected by the first to L^th internal addresses IADD<1:L>.

In the above-described electronic system 100 in accordance with the embodiment of the disclosure, an area may be reduced by sharing a calculation circuit for generating a parity and a syndrome including error information of data in a write operation and a read operation. Also, in the electronic system 100 in accordance with the embodiment of the disclosure, an efficient error correction operation may be performed by sharing the calculation circuit for generating a parity and a syndrome including error information of data loaded on the same input/output line in a write operation and a read operation.

Figure 11:
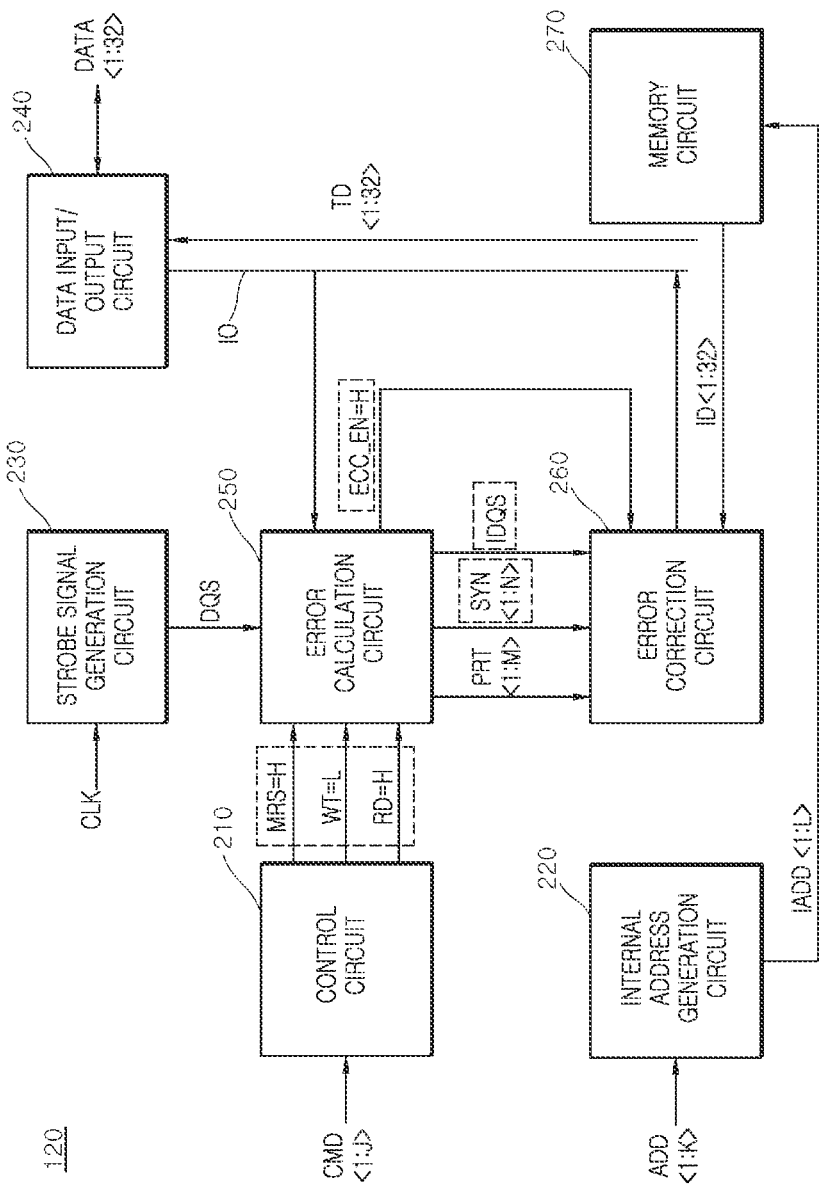

An error correction operation of correcting an error included in the first to 32nd internal data ID<1:32> and outputting error-corrected data during a read operation of the electronic system 100 in accordance with the embodiment of the disclosure will be described below as an example with reference to FIG. 11.

Before making description, the controller 110 outputs the clock CLK, the first to J^th commands CMD<1:J> and the first to K^th addresses ADD<1:K> for performing a read operation.

The control circuit 210 generates the mode setting signal MRS and the read signal RD which are enabled to logic high levels, by receiving the first to J^th commands CMD<1:J> for performing a read operation.

In the read operation, the internal address generation circuit 220 generates the first to L^th internal addresses IADD<1:L> by decoding the first to K^th addresses ADD<1:K>.

The strobe signal generation circuit 230 generates, from the clock CLK, the strobe signal DQS which toggles during a read operation period.

The memory circuit 270 outputs the first to 32nd internal data ID<1:32> stored in a memory region (not illustrated) selected by the first to L^th internal addresses IADD<1:L>.

In the read operation, the error correction circuit 260 generates the first to 32nd transfer data TD<1:32> from the first to 32nd internal data ID<1:32>, and outputs the first to 32nd transfer data TD<1:32> to the input/output line IO.

The error calculation circuit 250 generates the error correction enable signal ECC_EN which is enabled to a logic high level, by receiving the mode setting signal MRS of a logic high level and the read signal RD of a logic high level. The error calculation circuit 250 generates the first to N^th syndromes SYN<1:N> including error information depending on a result of calculating the bits included in the first to 32nd transfer data TD<1:32> loaded on the input/output line IO during a period in which the error correction enable signal ECC_EN is enabled. The error calculation circuit 250 generates the internal strobe signal IDQS from the strobe signal DQS, by receiving the mode setting signal MRS of a logic high level and the read signal RD of a logic high level.

The error correction circuit 260 generates the first to 32nd transfer data TD<1:32> by correcting an error, included in the first to 32nd internal data ID<1:32>, by the first to N^th syndromes SYN<1:N> during a period in which the error correction enable signal ECC_EN is enabled. The error correction circuit 260 outputs the error-corrected first to 32nd transfer data TD<1:32> to the input/output line IO in synchronization with the internal strobe signal IDQS.

The data input/output circuit 240 generates the first to 32nd data DATA<1:32> from the first to 32nd transfer data TD<1:32> loaded on the input/output line IO. The data input/output circuit 240 outputs the first to 32nd data DATA<1:32> to the controller 110.

The controller 110 receives the first to 32nd data DATA<1:32>.

In the above-described electronic system 100 in accordance with the embodiment of the disclosure, an area may be reduced by sharing a calculation circuit for generating a parity and a syndrome including error information of data in a write operation and a read operation. Also, in the electronic system 100 in accordance with the embodiment of the disclosure, an efficient error correction operation may be performed by sharing the calculation circuit for generating a parity and a syndrome including error information of data loaded on the same input/output line in a write operation and a read operation.

Figure 12:
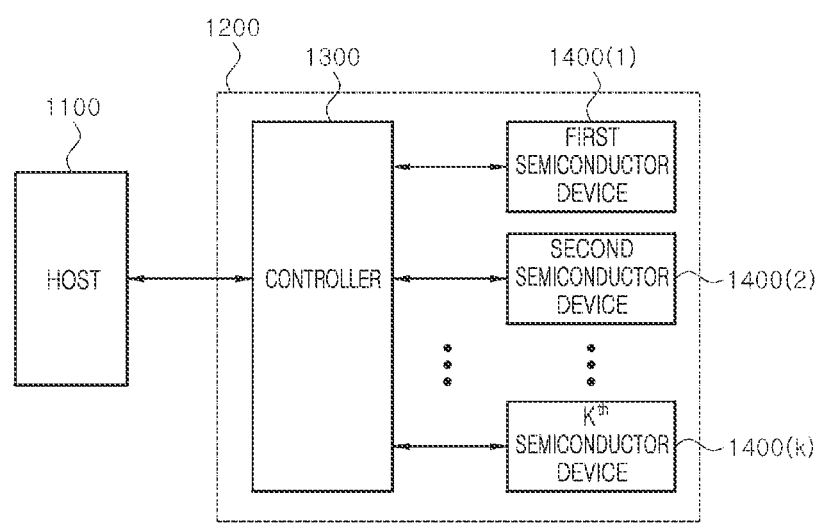
FIG. 12 is a diagram illustrating a configuration of an electronic system in accordance with another embodiment of the present disclosure.

FIG. 12 is a block diagram illustrating a configuration of an electronic system 1000 in accordance with another embodiment of the disclosure. As illustrated in FIG. 12, the electronic system 1000 may include a host 1100 and a semiconductor system 1200.

The host 1100 and the semiconductor system 1200 may transmit signals to each other by using an interface protocol. Examples of the interface protocol used between the host 1100 and the semiconductor system 1200 may include MMC (multimedia card), ESDI (enhanced small disk interface), IDE (integrated drive electronics), PCI-E (peripheral component interconnect-express), ATA (advanced technology attachment), SATA (serial ATA), PATA (parallel ATA), SAS (serial attached SCSI), and USB (universal serial bus).

The semiconductor system 1200 may include a controller 1300 and semiconductor devices 1400(k:1). The controller 1300 may control the semiconductor devices 1400(k:1) such that each of the semiconductor devices 1400(k:1) performs a write operation and a read operation. Each of the semiconductor devices 1400(k:1) may reduce an area by sharing a calculation circuit for generating a parity and a syndrome including error information of data in a write operation and a read operation. Also, each of the semiconductor devices 1400(k:1) may perform an efficient error correction operation by sharing the calculation circuit for generating a parity and a syndrome including error information of data loaded on the same input/output line in a write operation and a read operation. The controller 1300 may be implemented by the controller 110 illustrated in FIG. 1. Each of the semiconductor devices 1400(k:1) may be realized by the semiconductor device 120 illustrated in FIG. 1. According to an embodiment, the semiconductor device 120 may be realized by one type of memory among DRAM (dynamic random access memory), PRAM (phase change random access memory), RRAM (resistive random access memory), MRAM (magnetic random access memory), and FRAM (ferroelectric random access memory).

While various embodiments have been described above, it will be understood by those skilled in the art that the described embodiments represent a subset of a larger number of possible embodiments. Accordingly, the electronic system for performing an error correction operation described herein should not be limited based on the described embodiments.

What is claimed is:

1. An electronic system comprising:
   a controller configured to output a clock, a command, and an address, and configured to receive and transmit data; and
   a semiconductor device including an error calculation circuit,
   wherein the semiconductor device is configured to generate, by the error calculation circuit:

a parity including information on an error included in first transfer data generated from the data, in a write operation initiated by the command; and a syndrome including information on an error included in second transfer data generated from internal data, in a read operation initiated by the command, wherein, the first transfer data and the second transfer data are loaded on same input/output line, and wherein the semiconductor device comprises:

a control circuit configured to generate a mode setting signal, a write signal, and a read signal depending on a logic level combination of the command;

a data input/output circuit configured to output the first transfer data, generated by receiving the data, loaded on an input/output line in the write operation, and configured to output the second transfer data, loaded on the input/output line, as the data in the read operation; and the error calculation circuit configured to generate an error correction enable signal when the mode setting signal is enabled and any one of the write signal and the read signal is enabled, and configured to generate the parity and the syndrome including error information depending on a result of calculating bits included in the first transfer data and the second transfer data loaded on the input/output line.

2. The electronic system of claim 1, wherein the error calculation circuit is configured to:

be shared in the write operation and the read operation; and generate the parity by calculating bits included in the first transfer data or generate the syndrome by calculating bits included in the second transfer data.

3. The electronic system of claim 1, wherein the semiconductor device is configured to:

store the internal data generated by correcting an error included in the first transfer data by the parity in the write operation; and output, as the data, the second transfer data generated by correcting an error included in the internal data by the syndrome in the read operation.

4. The electronic system of claim 1, wherein the error calculation circuit comprises:

an enable signal generation circuit configured to generate the error correction enable signal which is enabled when any one of the write signal and the read signal is inputted during a period in which the mode setting signal is enabled;

an internal strobe signal generation circuit configured to generate an internal strobe signal by buffering a strobe signal generated from the clock, when any one of the write signal and the read signal is inputted during a period in which the error correction enable signal is enabled; and a calculation circuit configured to generate the parity including the error information by comparing bits included in the first transfer data during a period in which the error correction enable signal is enabled in the write operation, and configured to generate the syndrome including the error information by comparing bits included in the second transfer data during a period in which the error correction enable signal is enabled in the read operation.

5. The electronic system of claim 4, wherein the enable signal generation circuit comprises:

a detection signal generation circuit configured to generate a detection signal which is enabled when any one of the write signal and the read signal is inputted during a period in which the mode setting signal is enabled; and a buffer circuit configured to generate the error correction enable signal by buffering the detection signal during a period in which the mode setting signal is enabled.

6. The electronic system of claim 4, wherein the internal strobe signal generation circuit comprises:

a transfer control signal generation circuit configured to generate a transfer control signal which is enabled when any one of the write signal and the read signal is inputted to the transfer control signal generation circuit; and a signal transfer circuit configured to generate the internal strobe signal by buffering the strobe signal during a period in which the error correction enable signal and the transfer control signal are enabled.

7. The electronic system of claim 4, wherein the calculation circuit comprises:

a comparison signal generation circuit configured to generate first comparison signal and second comparison signal by comparing bits included in the first transfer data and the second transfer data during a period in which the error correction enable signal is enabled;

a parity generation circuit configured to generate the parity depending on a first result of calculating bits included in the first comparison signal; and a syndrome generation circuit configured to generate the syndrome depending on a second result of calculating bits included in the first comparison signal.

8. The electronic system of claim 1, wherein the semiconductor device further comprises:

an error correction circuit configured to generate the internal data by correcting an error included in the first transfer data, by the parity, during a period in which the error correction enable signal is enabled in the write operation, and configured to generate the second transfer data by correcting an error included in the internal data, by the syndrome, during a period in which the error correction enable signal is enabled in the read operation; and a memory circuit configured to store, in the write operation, the internal data by an internal address generated from the address, and configured to output, in the read operation, the internal data stored therein by the internal address.

9. The electronic system of claim 8, wherein the error correction circuit is configured to:

generate the internal data by correcting an error included in the first transfer data loaded on the input/output line in the write operation; and output the second transfer data, generated by correcting an error included in the internal data, to the input/output line in the read operation.

10. The electronic system of claim 8, wherein the error correction circuit comprises:

a data transfer circuit configured to output the first transfer data as first input data during a period in which the error correction enable signal is enabled in the write operation, and configured to output second input data as the second transfer data during a period in which the error correction enable signal is enabled in the read operation;

a strobe signal transfer circuit configured to transfer the internal strobe signal as an input strobe signal during a period in which the error correction enable signal is enabled; and a data processing circuit configured to generate the internal data by correcting an error included in the first input data, by the parity, in synchronization with the input strobe signal in the write operation, and configured to generate the second input data by correcting an error included in the internal data, by the syndrome, in the read operation.

11. The electronic system of claim 10, wherein the data transfer circuit comprises:
a write data transfer circuit configured to transfer the first transfer data as the first input data during a period in which the error correction enable signal is enabled in the write operation; and
a read data transfer circuit configured to transfer the second input data as the second transfer data during a period in which the error correction enable signal is enabled in the read operation.

12. An electronic system comprising:
a control circuit configured to generate a mode setting signal, a write signal, and a read signal depending on a logic level combination of a command; and
an error calculation circuit configured to:
generate an error correction enable signal and generate a parity including error information depending on a result of calculating bits included in first transfer data loaded on an input/output line, in a write operation in which the mode setting signal is enabled and the write signal is inputted; and
generate the error correction enable signal and generate a syndrome including error information depending on a result of calculating bits included in second transfer data loaded on the input/output line, in a read operation in which the mode setting signal is enabled and the read signal is inputted.

13. The electronic system of claim 12, wherein the first transfer data is generated from data inputted from outside the electronic system, in the write operation, and the second transfer data is generated from internal data stored in the electronic system, in the read operation.

14. The electronic system of claim 12, wherein the error calculation circuit comprises:
an enable signal generation circuit configured to generate the error correction enable signal which is enabled when any one of the write signal and the read signal is inputted during a period in which the mode setting signal is enabled;
an internal strobe signal generation circuit configured to generate an internal strobe signal from a strobe signal when any one of the write signal and the read signal is inputted during a period in which the error correction enable signal is enabled; and
a calculation circuit configured to generate the parity including the error information by comparing bits included in the first transfer data during a period in which the error correction enable signal is enabled in the write operation, and is configured to generate the syndrome including the error information by comparing bits included in the second transfer data during a period in which the error correction enable signal is enabled in the read operation.

15. The electronic system of claim 14, wherein the enable signal generation circuit comprises:
a detection signal generation circuit configured to generate a detection signal which is enabled when any one of the write signal and the read signal is inputted during a period in which the mode setting signal is enabled; and a buffer circuit configured to generate the error correction enable signal by buffering the detection signal during a period in which the mode setting signal is enabled.

16. The electronic system of claim 14, wherein the internal strobe signal generation circuit comprises:
a transfer control signal generation circuit configured to generate a transfer control signal which is enabled when any one of the write signal and the read signal is inputted to the transfer control signal generation circuit; and
a signal transfer circuit configured to generate the internal strobe signal from the strobe signal during a period in which the error correction enable signal and the transfer control signal are enabled.

17. The electronic system of claim 14, wherein the calculation circuit comprises:
a comparison signal generation circuit configured to generate first comparison signal and second comparison signal by comparing bits included in the first transfer data and the second transfer data during a period in which the error correction enable signal is enabled;
a parity generation circuit configured to generate the parity depending on a first result of calculating bits included in the first comparison signal; and
a syndrome generation circuit configured to generate the syndrome depending on a second result of calculating bits included in the second comparison signal.

18. The electronic system of claim 12, further comprising an error correction circuit configured to:
generate internal data by correcting an error included in the first transfer data, by the parity, during a period in which the error correction enable signal is enabled in the write operation; and
generate the second transfer data by correcting an error included in the internal data, by the syndrome, during a period in which the error correction enable signal is enabled in the read operation.

19. The electronic system of claim 18, wherein the error correction circuit is configured to:
generate the internal data by correcting an error included in the first transfer data loaded on the input/output line in the write operation; and
output the second transfer data, generated by correcting an error included in the internal data, to the input/output line in the read operation.

20. The electronic system of claim 18, wherein the error correction circuit comprises:
a data transfer circuit configured to output the first transfer data as first input data during a period in which the error correction enable signal is enabled in the write operation, and configured to output second input data as the second transfer data during a period in which the error correction enable signal is enabled in the read operation;
a strobe signal transfer circuit configured to transfer the internal strobe signal as an input strobe signal during a period in which the error correction enable signal is enabled; and
a data processing circuit configured to generate the internal data by correcting an error included in the first input data, by the parity, in synchronization with the input strobe signal in the write operation, and configured to generate the second input data by correcting an error included in the internal data, by the syndrome, in the read operation.

21. The electronic system of claim 20, wherein the data transfer circuit comprises:

a write data transfer circuit configured to transfer the first transfer data as the first input data during a period in which the error correction enable signal is enabled in the write operation; and
a read data transfer circuit configured to transfer the second input data as the second transfer data during a period in which the error correction enable signal is enabled in the read operation.

\* \* \* \* \*